Sept. 10, 1968  B. J. KING  3,400,902
GAS INLET CONVERSION AND PROTECTION MEANS
Filed Jan. 13, 1966  2 Sheets-Sheet 1

INVENTOR.
BEN J. KING
BY Jacobi & Davidson
ATTORNEYS.

Sept. 10, 1968            B. J. KING            3,400,902

GAS INLET CONVERSION AND PROTECTION MEANS

Filed Jan. 13, 1966            2 Sheets-Sheet 2

INVENTOR.
BEN J. KING
BY Jacobi & Davidson
ATTORNEYS.

United States Patent Office
3,400,902
Patented Sept. 10, 1968

3,400,902
GAS INLET CONVERSION AND
PROTECTION MEANS
Ben J. King, 119 Whitecap Circle,
Maitland, Fla. 32751
Filed Jan. 13, 1966, Ser. No. 520,337
3 Claims. (Cl. 244—53)

ABSTRACT OF THE DISCLOSURE

An arrangement for converting the inlet of a duct through which gas flows so that it operates efficiently under varying gas dynamic conditions that may also include a means for preventing ingestion of foreign objects; more specifically it constitutes a device for modifying the inlet to a gas duct leading to the propulsion unit of an aircraft by providing the inlet to the gas ingestion duct with a forward extension means that may be positioned to render it effective or ineffective so that a high degree of efficiency may be had when operating at either sonic, subsonic or supersonic speeds.

---

This invention relates to open ended ducts through which gas flow occurs, and more particularly, it relates to an improvement for converting such ducts to operate efficiently under varying gas dynamic conditions and also to a means for preventing ingestion of foreign objects into such ducts. For simplicity of understanding, the invention will hereinafter be described in connection with jet aircraft inlet ducts, but it will be understood that aircraft is only exemplary of the uses to which the present invention may be applied and it should be understood that the invention is not limited to this particular application or environment.

The normal jet aircraft operates through a varying range of gas flow conditions or gas dynamic conditions; specifically, such an aircraft operates or must be capable of operation in the subsonic flow range, the sonic flow range and the supersonic flow range. The gas inlet, or jet duct for such aircraft should ideally operate efficiently under all of the foregoing gas range conditions. However, in the past, this ideal operation could not be accomplished because the inlet configuration for the jet duct had to be designed to operate efficiently in only a selected one of the flow ranges.

Specifically, if one considers the circular or annular form of inlet, which is the most common form encountered on jet ducts, such an inlet has to be designed to provide the engine or propulsion unit of the aircraft with as great a quantity of air as possible at the highest total pressure over the greatest flow area, while at the same time, providing a minimum frontal area or leading surface. Accordingly, in designing such an inlet configuration, such design necessarily had to be correlated to the particular Mach number expected to be encountered when the aircraft was in use. An aircraft designed to operate in a subsonic flow range, or at a Mach number less than one, would have its inlet configuration designed quite differently than the inlet configuration for an aircraft which is designed to operate in or beyond the sonic flow range. The design variation for these differing Mach numbers or flow conditions most significantly effect the leading surface or leading edge of the propulsion unit inlet.

Assuming that an inlet configuration is particularly designed to operate in the subsonic flow range, the leading edge or surface is so contoured and configured as to provide high efficiency and excellent total pressure recovery in the subsonic flow range. However, if an aircraft with this subsonic inlet configuration were operated in the supersonic flow range, the total pressure recovery would be drastically reduced and consequently the total thrust and efficiency of the propulsion unit would likewise be reduced. Naturally, the converse of this situation is also true, and thus an aircraft which is designed to operate in the supersonic flow range and which has its inlet configured for operation in such a flow range will not operate efficiently under subsonic flow conditions.

The normal jet aircraft which is in operation and use today, as well as those jet aircraft expected to be designed in the future, are specifically intended for operation in the supersonic flow range. Also, the maximum amount of flight time of such aircraft takes place in the supersonic flow range, and accordingly, the inlet configuration must necessarily be designed to produce maximum performance in the supersonic flow range. However, at least during takeoff, such an aircraft must operate under subsonic conditions, and must then pass through the sonic range into the supersonic range. It is under these takeoff conditions that the aircraft having the supersonic inlet configuration operates inefficiently, and as a result, less power is supplied for aircraft takeoff, the takeoff roll is longer, the climb rate is decreased, an doverall range and safety at low altitude flight is adversely effected.

It thus would appear to be highly beneficial to provide an aircraft having an inlet configuration which would operate with a high degree of efficiency and with maximum performance in both the subsonic flow range and the supersonic flow range. However, for reasons aforementioned, the particular design parameters for each of these conditions are so divergent from one another as to prevent any fixed or preformed type of inlet configuration from being satisfactory under both conditions. The present invention seeks to overcome this problem by providing means for selectively converting the inlet configuration from a subsonic form to a supersonic form.

Another problem which is particularly encountered with jet type aircraft is that of ingestion of foreign objects into the air inlets or propulsion ducts. Despite the fact that most major military and commercial air ports go to great trouble and expense to continually vacuum clean the aircraft airways and taxiways, small foreign objects such as rocks, stones, nuts, bolts, pieces of wire, and other similar objects often remain on or in the vicinity of the aircraft runways. When a jet propulsion unit is operated in the vicinity of these foreign objects, the air or gas being drawn into the inlet of the jet propulsion unit creates a spiral flow commonly known as the vortex effect. This vortex effect corresponds to a small type tornado, and as such, has great lifting power which tends to lift the foreign objects and to draw the same into the inlet. The typical jet propulsion unit has compressor fan blades and turbine blades moving at extremely high rotational velocity, and should these ingested foreign objects come into contact with these blades, the blades can become damaged or even broken. This can create an unbalance in the engine which is so serious that the entire engine can actually violently shake itself apart. However, even if this did not occur, the mere damage to the blades, without the breaking thereof, has an effect on the efficiency of the jet unit.

The problem of ingestion of foreign objects into jet engines has been recognized in the prior art, and the solution suggested by the prior art was the use of anti-ingestion screens. However, the prior art types of screens were generally unsatisfactory because they were located within the jet duct itself, at some point between the inlet thereof and the first stage of the engine compressor. Screens which were located in this area, however, caused an increase in pressure drop of the gas flow through the duct, and thus had an adverse effect on the performance of the jet. Also, certain forms of prior art anti-ingestion screens were retractable, and when such retraction took place, the collected debris merely remained deposited in the duct and eventually was drawn into the engine. The present invention departs from this prior art type of techniques in that it provides an anti-ingestion screen outside the duct and in advance of the inlet portion thereof, thereby preventing the foreign objects from ever entering the duct at all and also producing less pressure drop and thus less overall engine performance loss.

With the foregoing factors firmly in mind, it is, therefore, an object of the present invention to overcome the difficulties and deficiencies associated with jet aircraft ducts and the like, and to provide an improved construction for such ducts.

More particularly, it is an object of the present invention to provide a means for selectively converting the inlet configuration of an open ended aircraft duct to enable the same to operate efficiently under varying speeds and flow range conditions.

Another object of the present invention is to provide an improvement in aircraft ducts which prevents the ingestion of foreign objects into such ducts, while at the same time, producing no adverse effect upon engine performance.

A more specific object of the present invention is to provide an extension means for converting the inlet configuration of an open ended aircraft duct, which extension means can selectively be moved into an operating position and displaced therefrom.

Another specific object of the present invention is to provide an anti-ingestion screen to prevent the ingestion of foreign objects into jet aircraft ducts, with such anti-ingestion screen being operative outside the duct itself and in advance of the inlet of the duct.

Other objects, advantages, and salient features of the present invention will become apparent from the following detailed description, which, taken in connection with the annexed drawings, discloses a preferred embodiment hereof.

Referring to the drawings.

Figure 1:
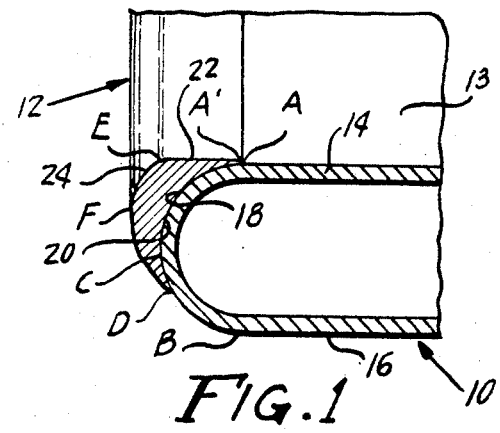
FIGURE 1 is an enlarged fragmentary sectional view of the inlet end of an open ended aircraft duct, such as a jet intake.

In accordance with the principles of the present invention, there is provided a propulsion unit having a casing or wall means defining a duct, which can generally be designated 10, a conversion means or forward extension means generally designated 12 for selectively varying the inlet configuration of the duct, and an anti-ingestion screen means generally designated 15 for preventing the ingestion of foreign objects into the duct.

As is conventional, and as is shown in various figures in the drawings, the propulsion unit in general has a casing formed of substantially continuous wall means which define a circular or annular outer portion which circumscribes an internal duct. It should, of course, be understood that the principles of the present invention are not necessarily limited to an annular or circular duct, but the same is used in the description following hereinafter for purposes of simplicity and also because the same represents the most common design in use today.

Referring to FIGURE 1, there is shown a mere fragmentary view of the means 10 and thus only a portion of the circumscribed internal duct 13. The means 10 is formed as a wall means having a substantially continuous interior surface 14 which circumscribes and thus defines the limits of the duct 13. The wall means also has a continuous exterior surface 16, and at the forward end of the duct, the interior surface 14 and the exterior surface 16 are joined to one another by a leading surface 18. As shown, this leading surface is at least substantially radially curved to thus form a rounded configuration extending between the interior and exterior surfaces of the wall means. The interior and exterior surfaces 14 and 16 extend preferably in a linear manner, axially of the duct 13. The leading surface 18 may be assumed to begin interiorly at a point designated A where the same starts to curve away from the interior surface 14, and may be considered to terminate exteriorly at a point designated B where the leading surface merges into the exterior surface 16 of the wall means. The leading surface 18 also has a medial point designated C which is disposed substantially midway between the surfaces 14 and 16 of the wall means, and which hence defines the forwardmost point of the leading surface 18. This duct means, as manufactured, with the leading surface 18 having the configuration ACB is the conventional design for a subsonic style inlet. That is, this is the configuration which is ideally designed for providing maximum efficiency and performance at Mach numbers less than one. Thus, this particular leading surface configuration ACB is the one which ideally is used during takeoff of a jet aircraft.

However, as set forth hereinabove, once a jet aircraft has taken off and has accelerated to its cruising speed, it will generally be operating in or near the supersonic flow range, that is, at Mach numbers in excess of one. Accordingly, in this operational range, the subsonic leading edge configuration ACB is inadequate and does not provide for maximum performance. It thus becomes desirable to convert the subsonic configuration ACB into a suitable supersonic configuration which achieves the desired pressure and flow results needed for supersonic flight. To this end, a conversion means or forward extension means 12 is brought into place in juxtaposition forwardly of the subsonic surface configuration ACB. The particular construction of the forward extension means, as well as its manner of juxtaposition to the leading surface 18, becomes clear by reference to FIGURE 1.

Figure 7:
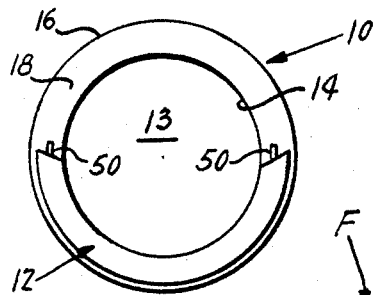
FIGURE 7 is a front end view of a modified form of the present invention in retracted position.
Figure 8:
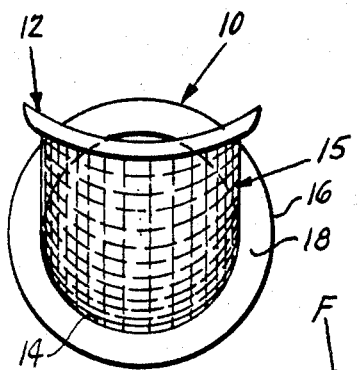
FIGURE 8 is a front end view of the unit of FIGURE 7 in extended position.
Figure 9:
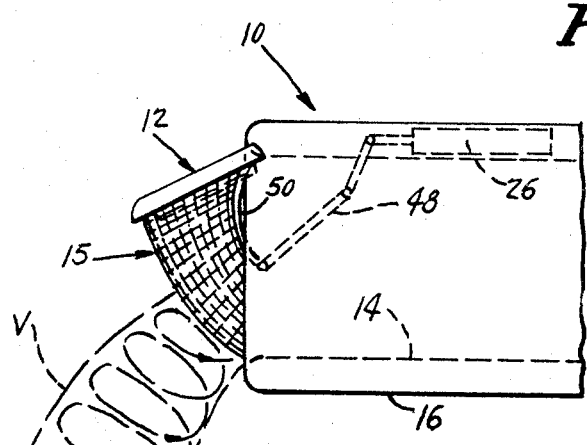
FIGURE 9 is a fragmentary side elevational view of the unit of FIGURE 8.

Before examining in detail the specific cross sectional shape of the extension means 12, it should be recognized that such extension means in any event extends at least partially about the extent of the leading surface 18. In the preferred instance, if one assumes that the leading surface 18 is circular or annular, the extension means 12 is likewise circular or annular, as shown in FIGURES 2, 3, 5 and 6. It may, however, be desirable to use a semi-annular configuration for the means 12, or at least some configuration which is less than fully annular. Such a semi-annular configuration is shown in FIGURES 7-9, and while the same is only approximately 60% as effective as the fully annular style, there are nevertheless certain advantages attendant thereto, particularly with respect to the anti-ingestion screen 15, and these advantages will be described more fully hereinafter.

Again referring to FIGURE 1, for a detailed analysis of the cross-sectional configuration of the forward extension means 12, it will be seen that such means has a concave inner surface 20 radially curved in a manner which is complemental to the radial curve of the leading surface 18. Thus, when desired, the concave inner surface 20 and the leading surface 18 can be juxtaposed to one another in surface-to-surface abutting contact. When in such abutting contact, there is thus the assurance that no gas flow will occur between the surfaces 18 and 20, but instead, all such gas flow will occur along the external surface of the extension means 12. As can be seen, the concave inner surface 20 has an extent from an end nominally defined as a first end, and designated A', to an end nominally defined as a second end, and designated D. When the surfaces 18 and 20 are in abutting surface-to-surface contact, as shown in FIGURE 1, the first end A' is substantially coincident with the point A where the leading surface 18 merges into the interior surface 14 of the wall means. The second end D can, if desired, be varied somewhat in position, but in any event it must be disposed at least as far along the leading surface as the medial point C thereof, and it must terminate short of the end B on the leading surface. In other words, and in the usual instance, the second end D is disposed somewhere between the medial point C and the point B where the leading surface 18 merges into the exterior surface 16 of the wall means.

The outer or exterior surface of the forward extension means, across which the gas flow occurs when entering the duct 13, is formed of two portions which merge smoothly into one another. The first of such portions is designated 22 and extends from the first end A', in a linear manner, to a point designated E. This portion 22, which could also be defined as A'E, is thus coextensive with the interior surface 14 of the wall mean and thereby serves to define or create an extension at the forward portion of the duct 13. The other outer portion of the forward extension means 12 is designated 24 and extends in an arcuately curved manner from the point E at the end of the portion 22 around to the point D at the terminal end of the concave inner surface 20. The portion 24 merges smoothly into the surface portion 22, and also serves to define a smooth merging curve with that portion of the leading surface 18 extending from the point B to the point D. That point along the outer surface portion 24 which defines the forwardmost point of the extension means 12 is designated F, and it will be noted that, in any event, the point F is disposed and displaced forwardly of the medial point C on the leading surface 18 and is disposed closer to the duct 13.

The overall result of juxtaposing the forward extension means 12 in the manner shown in FIGURE 1 is that the leading surface surrounding the duct 13 is changed from the subsonic configuration ACB to a supersonic configuration designated A'EFDB. Thus, when the aircraft is on the ground and is about to take off, the forward extension means 12 is removed, in a manner which will be presently described, and the subsonic configuration ACB is presented at the inlet end of the duct 13. In this manner, the aircraft can take off with less power, with less of a takeoff roll, with less fuel consumption and with increased climb rates, range and safety. Once the aircraft is in flight and has reached supersonic speed, the forward extension means 12 can then be replaced to the position shown in FIGURE 1, again in a manner to be presently described, and when this occurs, the inlet end of the duct will have the supersonic flight configuration A'EFDB. As a result, the total pressure recovery of such a configuration will be high, and the total thrust, efficiency and overall performance of the aircraft propulsion unit will be maximized.

Figure 2:
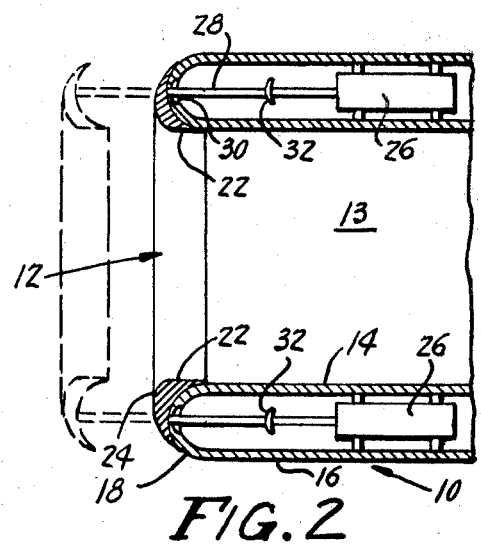
FIGURE 2 is a fragmentary sectional view of the forward end of the overall jet intake, with conversion means in accordance with the present invention being disposed thereupon.

If attention is now directed to FIGURE 2, there can now be described the selectively operable means for moving the forward extension means 12 from the position of FIGURE 1, where the concave inner surface 20 is in abutting surface-to-surface contact with the leading surface 18, to a position where such concave inner surface 20 is spaced a finite distance away from the leading surface 18. In FIGURE 2, there is shown an actuating means 26 mounted within the wall means between the interior surface 14 and the exterior surface 16 thereof. Such actuating means can be of any suitable form, such as, for example, a hydraulic or pneumatic cylinder, an electro-mechanical or solenoid means, a mechanical arrangement, or any other suitable arrangement for accomplishing reciprocal movement axially of the duct 13. Preferably, at least two such actuating means 26 are provided, and each has a rod 28 extending therefrom toward the leading surface 18. Openings 30 are provided in the leading surface 18 to thereby permit the rods 28 to extend therethrough and to be connected to the forward extension means 12 along the concave inner surface 20 thereof. In the particular embodiment shown in FIGURE 2, selective operation of the actuating means 26 causes the rods 28 to advance forwardly, thereby moving the forward extension means 12 from its solid line position in contact with the leading surface 18 to its dotted line position which is advanced and spaced a finite distance away from the leading surface 18. Flange means 32 are provided at an appropriate location along each rod 28 so that when the forward extension means 12 is moved to its extended position, as shown in dotted lines, the flange means 32 will seal the openings 30 to substantially prevent air flow into the interior of the wall means 10. Naturally, the dotted line or extended position of the forward extension means 12, as shown in FIGURE 2, is used during subsonic flow conditions, particularly during takeoff. At such time, the air flow will be across the leading surface 18, in its unconverted or unmodified condition, since the forward extension means 12 is spaced away therefrom.

Another factor to consider in connection with aircraft ducts of this type, as mentioned hereinabove, is the problem of ingestion of foreign objects into the duct. Naturally, this problem is most severe when the aircraft is on the ground and is preparing for, or in the process of, take off. As was explained hereinabove, operation of a jet engine creates what is commonly known as the vortex effect, a sort of spiralling action where the air swirls upwardly and into the duct 13, thereby lifting any foreign objects in the vicinity of the vortex up and into the duct. A typical vortex flow effect is shown descriptively in FIGURE 3 and is designated V.

Figure 3:
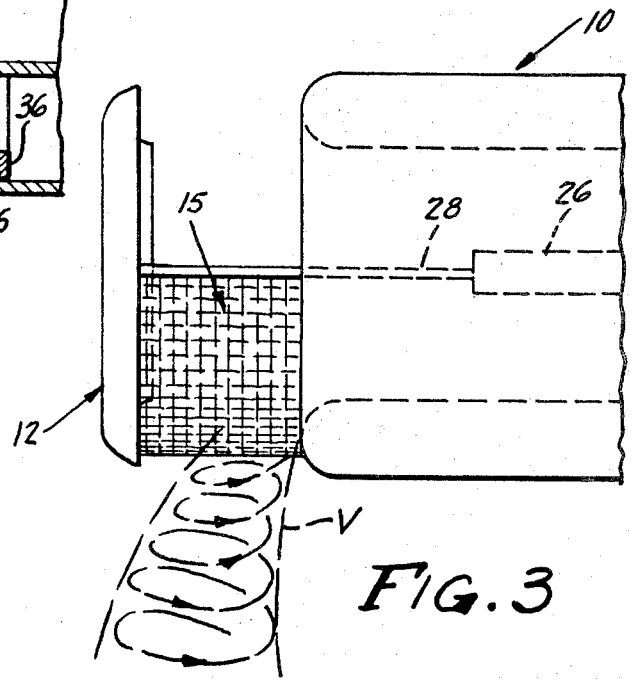
FIGURE 3 is a fragmentary side elevational view of the unit of FIGURE 2, with the conversion means in extended position, and further incorporating an anti-ingestion screen in accordance with the principles of the present invention.

In an effort to prevent such ingestion of foreign objects, an anti-ingestion screen generally designated 15 is provided. The screen 15, which can be formed of a fine wire mesh, of either one or several layers, is attached to the forward extension means 12 in the manner shown in FIGURE 3. The screen 15 of FIGURE 3 is of only a semi-circular or annular configuration, but is disposed along the lower half of the duct 13 to counteract the effects of the vortex V which tends to lift the foreign objects upwardly into the duct. As aforesaid, the extension means 12 is necessarily in its extended or advanced position during subsonic flow conditions, such as takeoff and landing, and since the anti-ingestion screen 15 is attached to this forward extension means, it necessarily assumes its operative position in advance of the duct during such subsonic flow conditions. Since this is the only time at which the vortex effect tends to draw objects into the duct, the use of such an anti-ingestion screen thereby necessarily overcomes the harmful or potentially harmful ingestion effects of the vortex.

Figure 4:
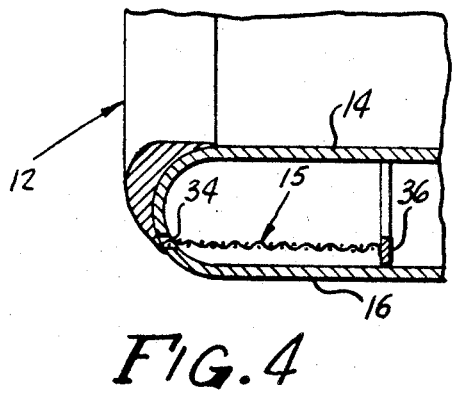
FIGURE 4 is a fragmentary sectional view of the unit of FIGURE 3, with the conversion means and anti-ingestion screen in retracted position.

When such an anti-ingestion screen 15 is utilized, a slot 34 must be formed in the leading surface 18 to thereby enable the screen 15 to retract through the slot and to be disposed between the surfaces 14 and 16 of the wall means when the forward extension means 12 is in its retracted position, as shown in FIGURE 4. A flange means 36 is provided at the rear end of the screen 15, so that when the screen is in the extended position of FIGURE 3, the flange means 36 will seal the slot 34, thereby preventing air flow into the wall means between the surfaces 14 and 16.

Figure 5:
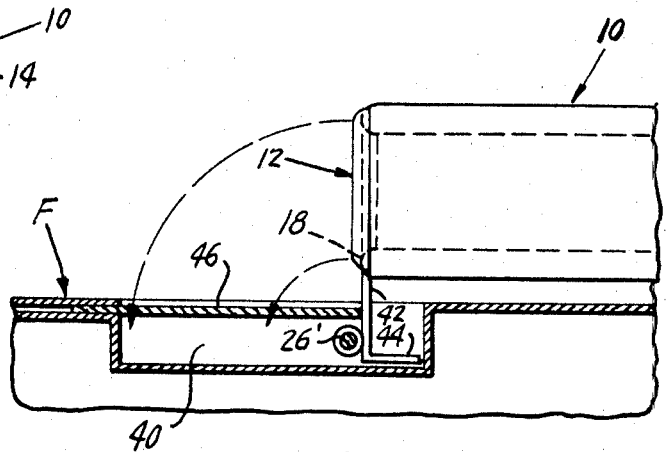
FIGURE 5 is a fragmentary top plan view of a modified form of the present invention with the conversion means in operative position.
Figure 6:
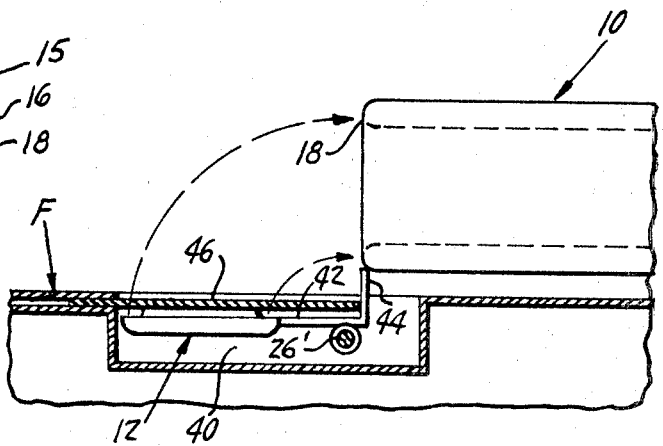
FIGURE 6 is a view, similar to FIGURE 5, but with the conversion means in a retracted position.

Referring now to the modification of the present invention as shown in FIGURES 5 and 6, it can be pointed out that this modification is particularly useful when the duct or wall means 10 is interconnected to or disposed in close juxta-position to the fuselage F of an airplane. In this instance, a chamber 40 is formed within the fuselage in such a location as to be able to receive the forward extension means 12 when the same is swung to a retracted position. In such instance, the actuating means 26 and rods 28 utilized in the embodiments previously described, are not necessary, and instead, a rotational form of actuating means 26' is disposed within the chamber 40. This actuating means is connected to a leg 42 which extends out of the chamber to connect to the forward extension means 12, in the manner shown in FIGURE 5. At the end of the leg portion 42, opposite that end which is connected to the forward extension means 12, a second leg portion 44 is provided, being disposed in perpendicular relationship to the leg 42. A door 46 is slidably mounted in the fuselage to extend at least partially over the chamber 40, and to contact whichever leg, 42 or 44, is extending out of the chamber. In operation, when the aircraft is operating under subsonic flow range conditions, the extension means 12 is not needed, and accordingly the same is nested in the chamber 40 in the manner shown in FIGURE 6. When the extension means is so disposed, the leg portion 44 projects outwardly from the chamber into substantial coincidence with the exterior surface of the wall means 10. As such, it tends to prevent or at least interrupt air flow between the duct and the fuselage. As shown in FIGURE 6, the door means 46 slides outwardly until the same abuts against the leg portion 44.

When the aircraft has now taken off and has reached its supersonic flow range, the door 46 is slid away from the chamber 40, and the actuating means 26 is selectively operated to thereby swing the forward extension means 12 upwardly into juxaposition with the inlet end of the duct in the manner shown in FIGURE 5. Then, the door means can again be slid closed until the same abuts against the leg portion 42. While no anti-ingestion screen 15 is shown in connection with this modification of the invention, it should be recognized that such a screen can be used, just as the same was used in the embodiments of FIGURES 3 and 4. However, in this instance, the screen cannot be connected to the forward extension means 12, and instead, must have its own separate actuating mechanism within the wall means 10 to slide the screen inwardly and outwardly.

Referring now to the embodiment shown in FIGURES 7—9, it will be seen that this embodiment utilizes a forward extension means of only a semi-annular configuration. While this style of forward extension means does not accomplish as full a conversion of the inlet configuration as does the completely annular form, and in fact accomplishes only approximately sixty percent thereof, this form of extension means is quite useful in connection with the use of anti-ingestion screen 15. As shown in FIGURE 9, the actuating means 26 can still be mounted within the wall means 12, but to extend this semiannular form of extension means 12, a linkage 48 must be utilized to connect the actuating means to an arched rod 50 which attaches to each end of the forward extension means. Thus, when the actuating means is operated, the extension means is swung outwardly and upwardly to the position shown in FIGURES 8 and 9, thereby causing the anti-ingestion screen 15 to cover virtually the entire inlet to the duct 13. This provides almost complete protection against the vortex V and any foreign objects entrained therein.

In a model of the invention which was constructed in accordance with the features of FIGURES 7–9, the anti-ingestion screen was formed of two layers of screen. The inner screen was of approximately 2 mesh and of approximately 0.06 inch wire size, and it served the primary function of structural support for the outer screen. the outer screen was of approximately 4 mesh and of approximately 0.04 inch wire size, and was utilized to prevent ingestion of foreign obpects. With such an anti-ingestion screen extended to the position shown in FIGURES 8 and 9, it was found that the total pressure recovery at subsonic operating conditions was approximately 0.98, thus producing a maximum thrust loss of 1.8%. This thrust loss is certainly acceptable for the benefits derived through the use of the anti-ingestion screen, and for this reason, one might prefer to use this form of ingestion screen and the concomitant form of forward extension means of less than an annular configuration, particularly in an area where ingestion of foreign objects is a problem. Naturally, if desired, one could also use this semi-annular form of forward extension means, even without the anti-ingesiton screen 15.

After reading the foregoing detailed description, it should be apparent that the objects set forth at the outset of the specification have been successfully achieved by the invention herein described. Accordingly,

What is claimed is:

1. In an aircraft having at least one propulsion unit capable of operating said aircraft between a subsonic flow range and a supersonic flow range, the improvement comprising:

said propulsion unit having substantially continuous wall means, the interior surface of which defines an internal duct;

said wall means terminating at a leading surface defining the forward end of said duct;

said leading surface being radially curved to form a rounded configuration extending between said interior surface and the exterior surface of said wall means;

said leading surface having a medial point disposed substantially midway between said wall means interior and exterior surfaces and defining the forwardmost point on said leading surface;

forward extension means disposed in advance of said leading surface and extending at least partially thereabout;

said forward extension means having a concave inner surface radially curved in a complemental manner with the radial curve of said leading surface whereby said extension means inner surface and said leading surface can be juxtaposed in surface-to-surface abutting contact;

said concave inner surface having an extent from an end nominally defined as a first end to an opposite end nominally defined as a second end;

said first end, when said concave inner surface is juxtaposed in surface-to-surface abutting contact with said leading surface, being disposed substantially at the point where said radially curved leading surface merges into said interior surface of said wall means;

said second end, when said concave inner surface is juxtaposed in surface-to-surface abutting contact with said leading surface, being disposed at least at the medial point of said leading surface but terminating short of said exterior surface of said wall means;

said forward extension means having an outer surface formed of two portions merging smoothly into one another;

one of said extension means outer surface portions extending from said first end in a coextensive manner with said interior surface of said wall means to thus create an extension of said duct;

said other extension means outer surface portion being arcuately curved and extending from said one outer surface to said second point in a manner to present a blunt end on said forward extension;

selectively operable actuating means for moving said forward extension means from a position where said concave inner surface is in abutting surface-to-surface contact with said leading surface to a position where said concave inner surface is spaced a finite distance away from said leading surface; and screen means movably mounted within said wall means to prevent ingestion of foreign objects into said propulsion unit;

said leading surface including a slot therein for passage of said screen means, said screen means being coupled to said forward extension means for movement therewith.

2. The improvement defined in claim 1 wherein said wall means are annular in cross-section and wherein said screen means is at least semi-annular in cross-section, with said screen means being disposed in the lower portion of said wall means.

3. The improvement defined in claim 1 further including a sealing flange means coupled with said screen means to cover said slot when said forward extension means is spaced away from said leading surface by said finite distance.

References Cited
UNITED STATES PATENTS

| | | | |
|---|---|---|---|
| 2,928,497 | 3/1960 | Stockdale | 60—39.09 X |
| 3,058,693 | 10/1962 | Doak | 244—53.8 X |
| 3,104,522 | 9/1963 | Pennington et al. | 60—35.6 |
| 3,161,379 | 12/1964 | Lane | 244—53.8 |

OTHER REFERENCES 1,150,625   1/1958   France.

MILTON BUCHLER, *Primary Examiner.*

B. BELKIN, *Assistant Examiner.*